(12) United States Patent  
Ou

(10) Patent No.: US 11,075,534 B2  
(45) Date of Patent: Jul. 27, 2021

(54) USB TYPE-C INTERFACE CIRCUIT AND CHARGING METHOD THEREOF, USB DEVICE

(71) Applicant: Hynetek Semiconductor Co., Ltd., Shenzhen (CN)

(72) Inventor: Yingyang Ou, Shenzhen (CN)

(73) Assignee: HYNETEK SEMICONDUCTOR CO., LTD., Shenzhen (CN)

(*) Notice: Subject to any disclaimer, the term of this patent is extended or adjusted under 35 U.S.C. 154(b) by 69 days.

(21) Appl. No.: 16/704,267

(22) Filed: Dec. 5, 2019

(65) Prior Publication Data

US 2021/0111578 A1   Apr. 15, 2021

Related U.S. Application Data

(63) Continuation of application No. PCT/CN2019/115210, filed on Nov. 4, 2019.

(30) Foreign Application Priority Data

Oct. 12, 2019   (CN) .................. 201910967565.X

(51) Int. Cl.  
*H02J 7/04* (2006.01)  
*H02J 7/00* (2006.01)  
*G06F 1/26* (2006.01)

(52) U.S. Cl.  
CPC ........ *H02J 7/007182* (2020.01); *G06F 1/266* (2013.01); *H02J 2207/30* (2020.01)

(58) Field of Classification Search  
None  
See application file for complete search history.

(56) References Cited

U.S. PATENT DOCUMENTS

| | | | |
|---|---|---|---|
| 9,239,810 B2* | 1/2016 | Chen | G06F 13/4072 |
| 10,591,966 B1* | 3/2020 | Rodriguez De Castro | ................. H02M 3/158 |
| 2004/0153809 A1* | 8/2004 | Goto | H04L 43/0817 714/36 |
| 2008/0222432 A1* | 9/2008 | Gilbert | H01R 13/6675 713/300 |
| 2009/0002085 A1* | 1/2009 | Tarng | H03B 5/1228 331/167 |
| 2012/0131374 A1* | 5/2012 | Foster | G06F 13/423 713/501 |

(Continued)

*Primary Examiner* — Arun C Williams  
(74) *Attorney, Agent, or Firm* — IPro, PLLC

(57) ABSTRACT

A interface circuit includes: a power supply circuit, configured to output a DC voltage; a voltage conversion circuit, configured to convert the DC voltage to a target voltage, wherein the voltage conversion circuit is a step-down conversion circuit; a first Type-C port and a second Type-C port, configured to be connected to the respective loads; a switch circuit, connected to the power supply circuit, the voltage conversion circuit, the first Type-C port and the second Type-C port respectively; and a USB controller, configured to communicate with the first Type-C port and the second Type-C port respectively, and regulate the DC voltage and the target voltage according to supply voltages of the loads connected to the first Type-C port and the second Type-C port, and control the switch circuit to apply the DC voltage or the target voltage to a Type-C port connected to a corresponding load.

20 Claims, 10 Drawing Sheets

(56) References Cited

U.S. PATENT DOCUMENTS

| | | | |
|---|---|---|---|
| 2015/0031971 A1* | 1/2015 | Lisogurski | A61B 5/14552 600/324 |
| 2015/0061633 A1* | 3/2015 | Marchand | H02J 7/0063 323/299 |
| 2016/0218535 A1* | 7/2016 | Prete | H02J 7/0044 |
| 2017/0364463 A1* | 12/2017 | Chen | G06F 13/385 |
| 2018/0097385 A1* | 4/2018 | Li | H02M 7/02 |
| 2018/0131148 A1* | 5/2018 | Liu | H01R 31/02 |
| 2019/0036365 A1* | 1/2019 | Regupathy | H02J 7/00034 |

* cited by examiner

When the first supply voltage is greater than or equal to the second supply voltage, the first switch tube and the third switch tube are turned on, and the second switch tube and the fourth switch tube are turned off, if the first load connected to the first Type-C port re-requests a third supply voltage, and the third supply voltage is equal to the second supply voltage, regulate the DC voltage of the power supply circuit, wherein the regulated DC voltage is equal to the second supply voltage ~ S701

Control all the switch tubes in the switch circuit to be constantly on for a first predetermined duration ~ S702

Upon the first predetermined duration, control all the switch tubes in the switch circuit to be continuously turned on, or control the first switch tube and the third switch tube to be turned on, or control the first switch tube and the fourth switch tube to be turned on, or control the second switch tube and the third switch tube to be turned on, or control the second switch tube and the fourth switch tube to be turned on ~ S703

FIG. 7

When the first supply voltage is greater than or equal to the second supply voltage, the first switch tube and the third switch tube are turned on, and the second switch tube and the fourth switch tube are turned off, if the first load connected to the first Type-C port re-requests a fourth supply voltage, and the fourth supply voltage is less than the second supply voltage, regulate the DC voltage of the power supply circuit, wherein the regulated DC voltage is equal to the second supply voltage ~ S801

Control all the switch tubes in the switch circuit to be constantly on for a second predetermined duration ~ S802

Upon the second predetermined duration, control the second switch tube and the fourth switch tube to be continuously turned on, and control the first switch tube and the third switch tube to be turned off ~ S803

Regulate the target voltage of the voltage conversion circuit, such that the regulated target voltage is applied to the first Type-C port, wherein the regulated target voltage is equal to the fourth supply voltage ~ S804

FIG. 8

When the first supply voltage is greater than or equal to the second supply voltage, the first switch tube and the third switch tube are turned on, and the second switch tube and the fourth switch tube are turned off, if the second load connected to the second Type-C port re-requests a fifth supply voltage, and the fifth supply voltage is equal to the first supply voltage, regulate the target voltage of the voltage conversion circuit, wherein the regulated target voltage is equal to the first supply voltage — S901

Control all the switch tubes in the switch circuit to be constantly on for a third predetermined duration — S902

Upon the third predetermined duration, control all the switch tubes in the switch circuit to be continuously turned on, or control the first switch tube and the third switch tube to be turned on, or control the first switch tube and the fourth switch tube to be turned on, or control the second switch tube and the third switch tube to be turned on, or control the second switch tube and the fourth switch tube to be turned on — S903

FIG. 9

When the first supply voltage is greater than or equal to the second supply voltage, the first switch tube and the third switch tube are turned on, and the second switch tube and the fourth switch tube are turned off, if the second load connected to the second Type-C port re-requests a sixth supply voltage, wherein the sixth supply voltage is greater to the first supply voltage, regulate the target voltage of the voltage conversion circuit, wherein the regulated target voltage is equal to the first supply voltage — S1001

Control all the switch tubes in the switch circuit to be constantly on for a fourth predetermined duration — S1002

Upon the fourth predetermined duration, control the second switch tube and the fourth switch tube to be continuously turned on, and control the first switch tube and the third switch tube to be turned off — S1003

Regulate the DC voltage of the power supply circuit, such that the DC voltage is applied to the second Type-C port, wherein the regulated DC voltage is equal to the sixth supply voltage — S1004

FIG. 10

When the first supply voltage is less than or equal to the second supply voltage, the second switch tube and the fourth switch tube are turned on, and the first switch tube and the third switch tube are turned off, if the first load connected to the first Type-C port re-requests a seventh supply voltage, and the seventh supply voltage is equal to the second supply voltage, regulate the target voltage of the voltage conversion circuit, wherein the regulated target voltage is equal to the second supply voltage  —S1101

Control all the switch tubes in the switch circuit to be constantly on for a fifth predetermined duration  —S1102

Upon the fifth predetermined duration, control all the switch tubes in the switch circuit to be continuously turned on, or control the first switch tube and the third switch tube to be turned on, or control the first switch tube and the fourth switch tube to be turned on, or control the second switch tube and the third switch tube to be turned on, or control the second switch tube and the fourth switch tube to be turned on  —S1103

FIG. 11

When the first supply voltage is less than or equal to the second supply voltage, the second switch tube and the fourth switch tube are turned on, and the first switch tube and the third switch tube are turned off, if the first load connected to the first Type-C port re-requests a eighth supply voltage, and the eighth supply voltage is equal to the second supply voltage, regulate the target voltage of the voltage conversion circuit, wherein the regulated target voltage is equal to the second supply voltage  —S1201

Control all the switch tubes in the switch circuit to be constantly on for a sixth predetermined duration  —S1202

Upon the sixth predetermined duration, control the first switch tube and the third switch tube to be continuously turned on, and controlling the second switch tube and the fourth switch tube to be turned off  —S1203

Regulate the DC voltage of the power supply circuit, such that the DC voltage is applied to the first Type-C port, wherein the regulated DC voltage is equal to the eighth supply voltage  —S1204

FIG. 12

USB TYPE-C INTERFACE CIRCUIT AND CHARGING METHOD THEREOF, USB DEVICE

CROSS-REFERENCE TO RELATED APPLICATION

This disclosure is a continuation of International Patent Application No. PCT/CN2019/115210, filed on Nov. 4, 2019, which is based upon and claims priority of Chinese Patent Application No. 201910967565.X, filed on Oct. 12, 2019, titled "USB TYPE-C INTERFACE CIRCUIT AND CHARGING METHOD THEREOF, USB DEVICE AND ELECTRONIC DEVICE", the entire contents of which are incorporated herein by reference.

TECHNICAL FIELD

The present application relates to the technical field of electrical connectors, and in particular, relates to a USB Type-C interface circuit and a charging method thereof, a USB device and an electronic device.

BACKGROUND

As mobile devices impose more and more high requirements on transmission speed, charging power, interface dimension and the like, new generation of USB interfaces, i.e., USB Type-C interfaces emerge as time requires. To supply a maximum output power of 100 W, the suited USB power delivery specification (USB PD) is correspondingly proposed. According to the USB PD protocol, the USB interface is capable of bearing a 3 A or 5 A current, and outputting a maximum voltage of 20 V. In addition, a dedicated channel for communication of the power transmission protocol is defined in the interface, such that adaptive charging regulatory may be intelligently practiced between a charging device and a charged device, and thus charging efficiency is improved. By the USB PD protocol, an output Type-C port may charge one device. However, with the increase of the devices that support the Type-C port, to accommodate the requirements of charging a plurality of devices simultaneously, an adapter having a plurality of Type-C ports emerge. With respect to an adapter equipped with two Type-C ports, the following requirements are imposed:

When a single external device is inserted into any of the two Type-C ports, a maximum nominal power is output.

When external devices are simultaneously inserted into both of the Type-C ports, the output voltage at each Type-C port may still be regulated according to the requirements of the external devices.

When external devices are simultaneously inserted into both of the Type-C ports, the total power output by the two ports does not exceed a maximum nominal power.

In a first related art, referring to FIG. 1, FIG. 1 is a schematic structural diagram of a USB interface circuit in the related art. As illustrated in FIG. 1, in the technical solution according to this related art, two independent AC-to-DC conversion circuits are employed to respectively supply power to two Type-C ports, and inputs of the two AC-to-DC conversion circuits are input terminals of the adapter and are AC mains powers. Each Type-C port has a corresponding PD chip which carries out protocol handshake with the device by a CC line. When the external device is connected to the Type-C port, the output voltage desired by the device is determined by the USB PD protocol. The PD chip is connected to the AC-to-DC conversion circuit by a feedback terminal (FB), and the output voltage VOUT of the AD-to-DC conversion circuit may be regulated by the FB, to attain a target voltage desired by the device.

The technical solution according to this related art may accommodate the above application requirements. However, this technical solution requires two independent AC-to-DC conversion circuits, such that desired power circuits are twice the power circuits that are practically required. For example, to output a maximum output power of 60 W, it is required that two AC-to-DC conversion circuits both output an output power of 60 W, and correspondingly, the total designed power of the adapter at least reaches 120 W.

In a second related art, referring to FIG. 2, FIG. 2 is a schematic structural diagram of another USB interface circuit in the related art. As illustrated in FIG. 2, different from the first related art, in the technical solution according to the second related art, only one independent AC-to-DC conversion circuit is employed. The AC-to-DC conversion circuit is connected in series to two step-down converters respectively. Two PD chips are connected to the two step-down converters by a FB, respectively, and the FB directly regulates an output voltage VOUT of one of the step-down converters to attain a target nominal voltage upon PD handshake. In this way, the two Type-C ports are supplied with power respectively.

On the same condition that the above application requirements are accommodated, only one AC-to-DC converter is employed in the second related art. However, the two step-down converters connected in series to the AC-to-DC converter are employed in this technical solution.

In a third related art, referring to FIG. 3, FIG. 3 is a schematic structural diagram of still another USB interface circuit in the related art. As illustrated in FIG. 3, different from the first related art, in the technical solution according to the third related art, one AC-to-DC converter is employed, an output voltage VOUT1 of the AC-to-DC converter is one supply voltage of the two Type-C ports, and the AC-to-DC converter is connected to a step-on and step-down converter while outputting the voltage. The step-on and step-down converter performs voltage step-on or voltage step-down for the output voltage VOUT1 to attain a voltage VOUT2 desired by the other Type-C port.

On the same condition that the above application requirements are accommodated, only one AC-to-DC converter is employed in the third related art. However, the step-on and step-down converter requires more power devices over the step-down converter and its control is more complex.

SUMMARY

In a first aspect, embodiments of the present application provide a USB Type-C interface circuit. The USB Type-C interface circuit includes: a power supply circuit, configured to output a DC voltage; a voltage conversion circuit, configured to convert the DC voltage to a target voltage, wherein, the voltage conversion circuit is a step-down conversion circuit; a first Type-C port, configured to be connected to a first load; a second Type-C port, configured to be connected to a second load; a switch circuit, connected to the power supply circuit, the voltage conversion circuit, the first Type-C port and the second Type-C port respectively; and a USB controller, communicated with the first Type-C port and the second Type-C port, wherein the USB controller is configured to: regulate the DC voltage of the power supply circuit according to a maximum supply voltage of a first supply voltage of the first load and a second supply voltage of the second load, and control the switch circuit to apply the DC voltage to a Type-C port corresponding to the maximum supply voltage; and regulate the target voltage of the voltage conversion circuit according to a minimum supply voltage of the first supply voltage and the second supply voltage, and control the switch circuit to apply the target voltage to a Type-C port corresponding to the minimum supply voltage.

In a second aspect, embodiments of the present application provide a USB device. The USB device includes the USB Type-C interface circuit as described above.

In a third aspect, embodiments of the present application provide a charging method based on a USB-type C interface circuit. The method includes: determining a first supply voltage and a second supply voltage, wherein the first supply voltage is a supply voltage of a first load connected to a first Type-C port, and the second supply voltage is a supply voltage of a second load connected to a second Type-C port; regulating a DC voltage output by a power supply circuit according to a maximum supply voltage of the first supply voltage and the second supply voltage, and controlling a switch circuit to apply the DC voltage to a Type-C port corresponding to the maximum supply voltage, wherein the power supply circuit is connected to the first Type-C port and the second Type-C port by the switch circuit; and regulating a target voltage output by a voltage conversion circuit according to a minimum supply voltage of the first supply voltage and the second supply voltage, and controlling the switch circuit to apply the target voltage to a Type-C port corresponding to the minimum supply voltage, wherein the voltage conversion circuit is connected to the power supply circuit, the voltage conversion circuit is a step-down conversion circuit, and the voltage conversion circuit is connected to the first Type-C port and the second Type-C port by the switch circuit.

BRIEF DESCRIPTION OF THE DRAWINGS

FIG. 6b is a schematic flowchart of S63 in FIG. 6a;

FIG. 6c is a schematic flowchart of S65 in FIG. 6a;

FIG. 7 is a schematic flowchart of a charging method based on a USB Type-C interface circuit according to another embodiment of the present application;

FIG. 8 is a schematic flowchart of a charging method based on a USB Type-C interface circuit according to still another embodiment of the present application;

FIG. 9 is a schematic flowchart of a charging method based on a USB Type-C interface circuit according to yet still another embodiment of the present application;

FIG. 10 is a schematic flowchart of a charging method based on a USB Type-C interface circuit according to yet still another embodiment of the present application;

FIG. 11 is a schematic flowchart of a charging method based on a USB Type-C interface circuit according to yet still another embodiment of the present application;

FIG. 12 is a schematic flowchart of a charging method based on a USB Type-C interface circuit according to yet still another embodiment of the present application;

DETAILED DESCRIPTION

For better understanding of the present application, the present application is described in detail with reference to attached drawings and specific embodiments. It should be noted that when an element is defined as "being connected or coupled to" another element, the element may be directly connected or coupled to the element or one or more centered elements may be present therebetween. In addition, the terms "first", "second" and "third" are merely for the illustration purpose, and shall not be construed as indicating or implying a relative importance.

Unless the context clearly requires otherwise, throughout the specification and the claims, technical and scientific terms used herein denote the meaning as commonly understood by a person skilled in the art. Additionally, the terms used in the specification of the present application are merely for description the embodiments of the present application, but are not intended to limit the present application. As used herein, the term "and/or" in reference to a list of two or more items covers all of the following interpretations of the term: any of the items in the list, all of the items in the list and any combination of the items in the list.

Figure 1:
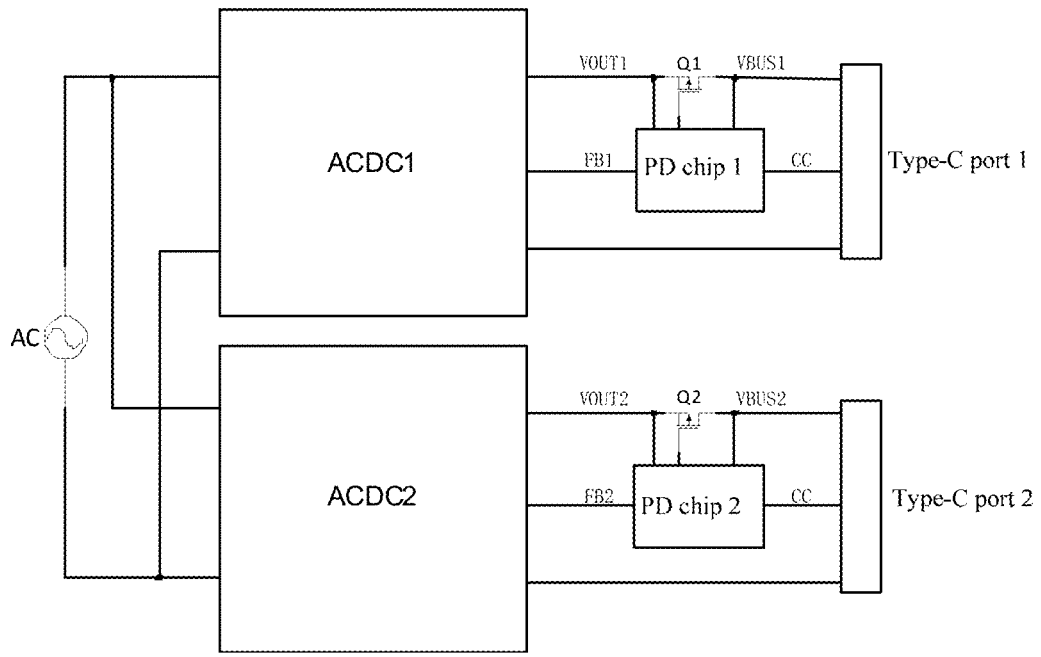
FIG. 1 is a schematic structural diagram of a USB Type-C interface circuit in the related arts.
Figure 2:
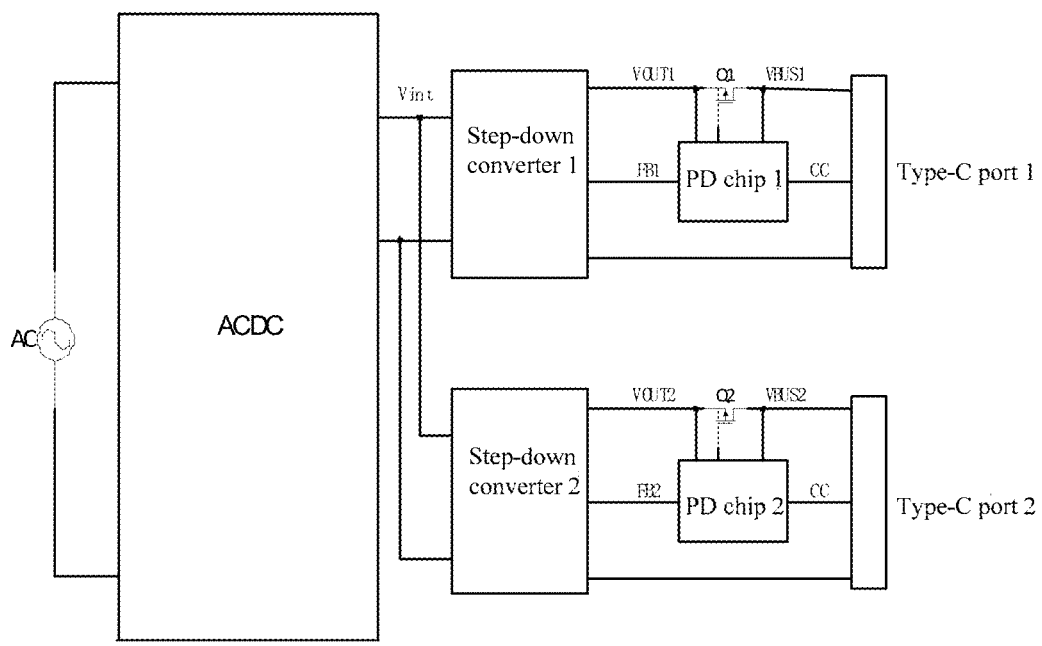
FIG. 2 is a schematic structural diagram of another USB Type-C interface circuit in the related arts.
Figure 3:
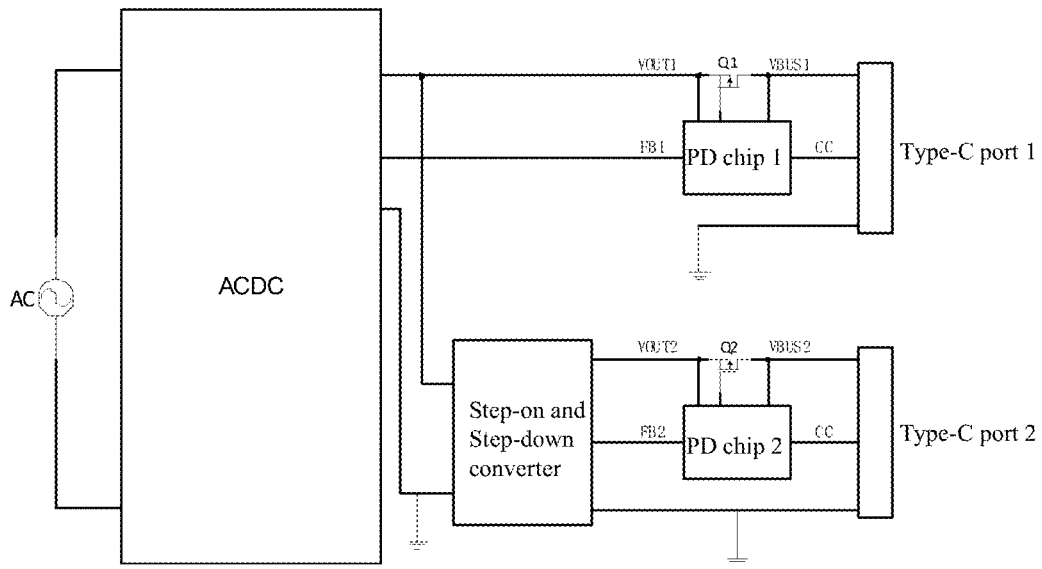
FIG. 3 is a schematic structural diagram of still another USB Type-C interface circuit in the related arts.
Figure 4:
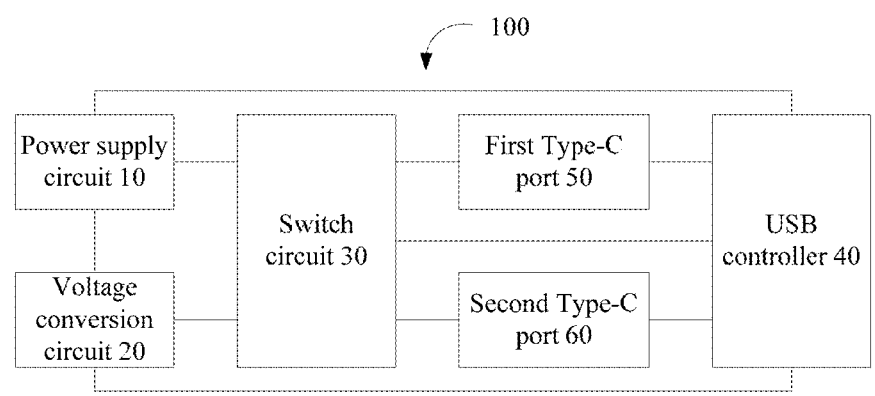
FIG. 4 is a functional block diagram of a USB Type-C interface circuit according to an embodiment of the present application.

As one aspect of the embodiments of the present application, an embodiment of the present application provides a USB Type-C interface circuit. Referring to FIG. 4, FIG. 4 is a functional block diagram of a USB Type-C interface circuit 100 according to an embodiment of the present application. As illustrated in FIG. 4, the USB Type-C interface circuit 100 includes a power supply circuit 10, a voltage conversion circuit 20, a switch circuit 30, a USB controller 40, a first Type-C port 50 and a second Type-C port 60. The USB controller 40 is connected to the first Type-C port 50 and the second Type-C port 60 respectively, and is configured to acquire a first supply voltage of a first load connected to the first Type-C port 50 and a second supply voltage of a second load connected to the second Type-C port 60. The switch circuit 30 is connected to the power supply circuit 10, the voltage conversion circuit 20, the first Type-C port 50 and the second Type-C port 60 respectively. The USB controller 40 is further connected to the power supply circuit 10, the voltage conversion circuit 20 and the switch circuit 30. The USB controller is further configured to regulate a DC voltage output by the power supply circuit 10 according to a maximum supply voltage of the first supply voltage of the first load and the second supply voltage of the second load, and control the switch circuit 30 to apply the DC voltage to a Type-C port corresponding to the maximum supply voltage; the USB controller 40 is further configured to regulate a target voltage output by the voltage conversion circuit 20 according to a minimum supply voltage of the first supply voltage and the second supply voltage, and control the switch circuit 30 to apply the target voltage to a Type-C port corresponding to the minimum supply voltage.

Specifically, the USB controller 40 communicates with the first Type-C port 50 and the second Type-C port 60, and determines the first supply voltage desired by the first load and the second supply voltage desired by the second load. The USB controller 40 simultaneously judges the values of the first supply voltage and the second supply voltage. When the first supply voltage is greater than the second supply voltage, the USB controller 40 sends a regulatory signal to the power supply circuit 10 to regulate the DC voltage of the power supply circuit 10, and sends a control signal to the switch circuit 30 to control the switch circuit 30 to perform a corresponding turn-on or turn-off action to apply the DC voltage to the first Type-C port 50; and meanwhile, the USB controller 40 sends a regulatory signal to the voltage conversion circuit 20 to regulate the target voltage of the voltage conversion circuit 20, and sends a control signal to the switch circuit 30 to control a corresponding turn-on or turn-off action to apply the target voltage to the second Type-C port 60. When the first supply voltage is less than the second supply voltage, the USB controller 40 sends a regulatory signal to the power supply circuit 10 to regulate the DC voltage of the power supply circuit 10, and sends a control signal to the switch circuit 30 to control the switch circuit 30 to perform a corresponding turn-on or turn-off action to apply the DC voltage to the second Type-C port 60; and meanwhile, the USB controller 40 sends a regulatory signal to the voltage conversion circuit 20 to regulate the target voltage of the voltage conversion circuit 20, and sends a control signal to the switch circuit 30 to control the switch circuit 30 to perform a corresponding turn-on or turn-off action to apply the target voltage to the first Type-C port 50.

The first load connected to the first Type-C port 50 and the second load connected to the second Type-C port 60 may be any external device having a USB Type-C interface, for example, a mobile phone, a tablet computer, a laptop computer, a smart bracelet or the like electronic device. The USB controller 40 may be any a microcontroller unit (MCU) or a USB interface chip having a USB interface, for example, a PD chip. It should be noted that the number of loads connected to the Type-C ports depends on the total number of Type-C ports in the USB Type-C interface circuit 100, which may be two or more than two. The loads are not limited to the first load and the second load. The first load and the second load herein are only for illustration purposes.

In this embodiment, the USB controller 40 communicates with the first Type-C port 50 and the second Type-C port 60, regulates the DC voltage and the target voltage according to the supply voltages of the loads connected to the first Type-C ports 50 and the second Type-C port 60, and controls the switch circuit 30 to apply the DC voltage or the target voltage to the Type-C port connected to the corresponding load. Therefore, according to this embodiment, a high device utilization rate is maintained and system efficiency is effectively improved, while multi-port charging requirements are satisfied.

Figure 5:
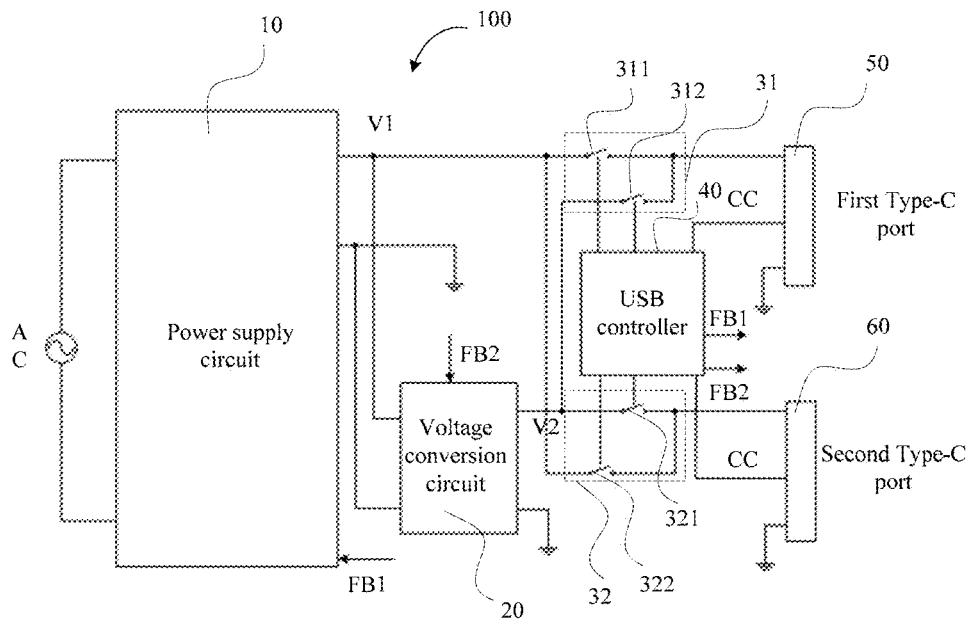
FIG. 5 is a schematic structural diagram of a USB Type-C interface circuit according to an embodiment of the present application.

In some embodiments, referring to FIG. 5, FIG. 5 is a schematic structural diagram of a USB Type-C interface circuit according to an embodiment of the present application. As illustrated in FIG. 5, the switch circuit 30 includes a first switch circuit 31 and a second switch circuit 32. The first switch circuit 31 is connected to the power supply circuit 10, the voltage conversion circuit 20, the first Type-C port 50 and the USB controller 40 respectively. The second switch circuit 32 is connected to the power supply circuit 10, the voltage conversion circuit 20, the second Type-C port 60 and the USB controller 40 respectively. The USB controller 40 is configured to regulate the DC voltage of the power supply circuit 10 according to the maximum supply voltage of the first supply voltage and the second supply voltage, and control the first switch circuit 31 and the second switch circuit 32 to apply the DC voltage to the Type-C port corresponding to the maximum supply voltage; and regulate the target voltage V2 of the voltage conversion circuit 20 according to the minimum voltage of the first supply voltage and the second supply voltage, and control the first switch circuit 31 and the second switch circuit 32 to apply the target voltage to the Type-C port corresponding to the minimum supply voltage.

In some embodiments, still referring to FIG. 5, the first switch circuit 31 includes a first switch tube 311 and a second switch tube 312. The first switch tube 311 is connected between the power supply circuit 10 and the first Type-C port 50, and the first switch tube 311 is connected to the USB controller 40. The second switch tube 312 is connected between the voltage conversion circuit 20 and the first Type-C port 50, and the second switch tube 312 is connected to the USB controller 40. When the first supply voltage is greater than or equal to the second supply voltage, the USB controller 40 is configured to control the first switch tube 311 to be turned on, and control the second switch tube 312 to be turned off, such that the DC voltage V1 is applied to the first Type-C port 50. When the first supply voltage is less than or equal to the second supply voltage, the USB controller 40 is configured to control the first switch tube 311 to be turned off, and control the second switch tube 312 to be turned on, such that the target voltage is applied to the first Type-C port 50.

The first switch tube 311 and the second switch tube 312 may be any controllable electronic device, for example, a metal oxide semiconductor field effect transistor (MOSFET), an insulated gate bipolar transistor (IGBT), a silicon controlled rectifier (SCR), a gate turn-off thyristor (GTO), a giant transistor (GTR) or the like; or may be any controllable switch device, for example, a contactor, a relay, a time delay switch, a photoelectric switch, a tact switch, a proximity switch or the like; or may be a combination of the above listed types.

In some embodiments, still referring to FIG. 5, the second switch circuit 32 includes a third switch tube 321 and a fourth switch tube 322. The third switch tube 321 is connected between the voltage conversion circuit 20 and the second Type-C port 60, and the third switch tube 321 is connected to the USB controller 40. The fourth switch tube 322 is connected between the power supply circuit 10 and the second Type-C port 60, and the fourth switch tube 322 is connected to the USB controller 40. When the first supply voltage is greater than or equal to the second supply voltage, the USB controller 40 is configured to control the third switch tube 321 to be turned on and control the fourth switch tube 322 to be turned off, such that the target voltage V2 is applied to the second Type-C port 60. When the first supply voltage is less than or equal to the second supply voltage, the USB controller 40 is configured to control the third switch tube 321 to be turned off and control the fourth switch tube 322 to be turned on, such that the DC voltage V1 is applied to the second Type-C port 60.

The third switch tube 321 and the fourth switch tube 322 may be any controllable electronic device, for example, a metal oxide semiconductor field effect transistor (MOSFET), an insulated gate bipolar transistor (IGBT), a silicon controlled rectifier (SCR), a gate turn-off thyristor (GTO), a giant transistor (GTR) or the like; or may be any controllable switch device, for example, a contactor, a relay, a time delay switch, a photoelectric switch, a tact switch, a proximity switch or the like; or may be a combination of the above listed types.

The power supply circuit 10 is an AC-to-DC conversion circuit or a DC-to-DC conversion circuit, and the voltage conversion circuit 20 is a step-down conversion circuit. This embodiment is hereinafter described with reference to FIG. 5. As illustrated in FIG. 5, the power supply circuit 10 is configured to be connected to a mains AC power supply system or a DC power supply system. The mains AC power supply system supplies an AC mains power to the power supply circuit 10, or the DC power supply system supplies a DC power to the power supply circuit 10. The power supply circuit 10 converts the AC mains power or the DC power to the DC voltage V1. The DC voltage V1 output by the power supply circuit 10 is divided into two paths. One path is output to the first Type-C port 50 or the second Type-C port 60 via the switch circuit 30, and the other path is output to the voltage conversion circuit 20. The voltage conversion circuit 20 steps down the DC voltage V1, outputs the target voltage V2, and outputs the target voltage V2 to the first Type-C port 50 or the second Type-C port 60 via the switch circuit 30.

When the first Type-C port 50 is connected to the first load, and the second Type-C port 60 is connected to the second load, the USB controller 40 communicates with the first Type-C port 50 via a CC line, and communicates with the second Type-C port 50 via a CC line. The USB controller 40 is configured to determine the first supply voltage desired by the first load and the second supply voltage desired by the second load, and compares the first supply voltage with the second supply voltage to further determine the values of the first supply voltage and the second supply voltage.

When the first supply voltage is greater than the second supply voltage, the USB controller 40 sends a control signal to the switch circuit 30 to control the first switch tube 311 and the third switch tube 321 to be turned on, and control the second switch tube 312 and the fourth switch tube 322 to be turned off; and the USB controller 40 sends a first regulatory signal via FB1 to the power supply circuit 10, and sends a second regulatory signal via FB2 to the voltage conversion circuit 20. The power supply circuit 10 regulates the voltage to be the DC voltage V1 equal to the first supply voltage according to the first regulatory signal, and applies the DC voltage V1 to the first Type-C port 50 by the first switch tube 311. A current output by the power supply circuit 10 flows, by the first switch tube 311, to the first load connected to the first Type-C port, such that the first load is charged. In addition, the voltage conversion circuit 20 regulates the DC voltage V1 to be the target voltage V2 equal to the second supply voltage according to the second regulatory signal, and applies the target voltage V2 to the second Type-C port 60. A current output by the step-down conversion circuit 20 flows, by the third switch tube 321, to the second load connected to the second Type-C port 60, such that the second load is charged.

When the first supply voltage is less than the second supply voltage, the USB controller 40 sends a control signal to the switch circuit 30 to control the first switch tube 311 and the third switch tube 321 to be turned off, and control the second switch tube 312 and the fourth switch tube 322 to be turned on; and the USB controller 40 sends a first regulatory signal via FB1 to the power supply circuit 10, and sends a second regulatory signal via FB2 to the voltage conversion circuit 20. The power supply circuit 10 regulates the voltage to be the DC voltage V1 equal to the first supply voltage according to the first regulatory signal, and applies the DC voltage V1 to the second Type-C port 60 by the fourth switch tube 322. A current output by the power supply circuit 10 flows, by the first switch tube 322, to the second load connected to the second Type-C port, such that the second load is charged. In addition, the voltage conversion circuit 20 regulates the DC voltage V1 to be the target voltage V2 equal to the first supply voltage according to the second regulatory signal, and applies the target voltage V2 to the first Type-C port 50. A current output by the step-down conversion circuit 20 flows, by the second switch tube 312, to the first load connected to the first Type-C port 50, such that the first load is charged.

When the first supply voltage is equal to the second supply voltage, either of the above two cases shall apply, which is not described herein any further.

In this embodiment, the USB controller 40 firstly determines the first supply voltage of the first load connected to the first Type-C port 50 and the second supply voltage of the second load connected to the second Type-C port 60, and compares the first supply voltage with the second supply voltage to determine the values thereof. The UBS controller 40 regulates the DC voltage V1 of the power supply circuit 10 according to the maximum supply voltage of the first supply voltage and the second supply voltage, and controls the switch circuit 30 to apply the DC voltage V1 to the Type-C port corresponding to the maximum supply voltage. In addition, the USB regulates the target voltage V2 of the voltage conversion circuit 20 according to the minimum supply voltage of the first supply voltage and the second supply voltage, and controls the switch circuit 30 to apply the target voltage V2 to the Type-C port corresponding to the minimum supply voltage. Therefore, according to this embodiment, a high device utilization rate is maintained and system efficiency is effectively improved, while multi-port charging requirements are satisfied.

In some embodiments, the USB controller 40 sends the first regulatory signal via FB1 to regulate the DC voltage output by the power supply circuit 10, wherein by the first regulatory signal, a voltage signal or a current signal may be output from or input to a voltage regulatory circuit in the power supply circuit 10, to regulate the DC voltage output by the power supply circuit 10; and the USB controller 40 sends the second regulatory signal via FB2 to regulate the target voltage output by the voltage conversion circuit 20, wherein by the second regulatory signal, a voltage signal or a current signal may be output from or input to a voltage regulatory circuit in the voltage conversion circuit 20 to regulate the target voltage output by the voltage conversion circuit 20.

Figure 6A:
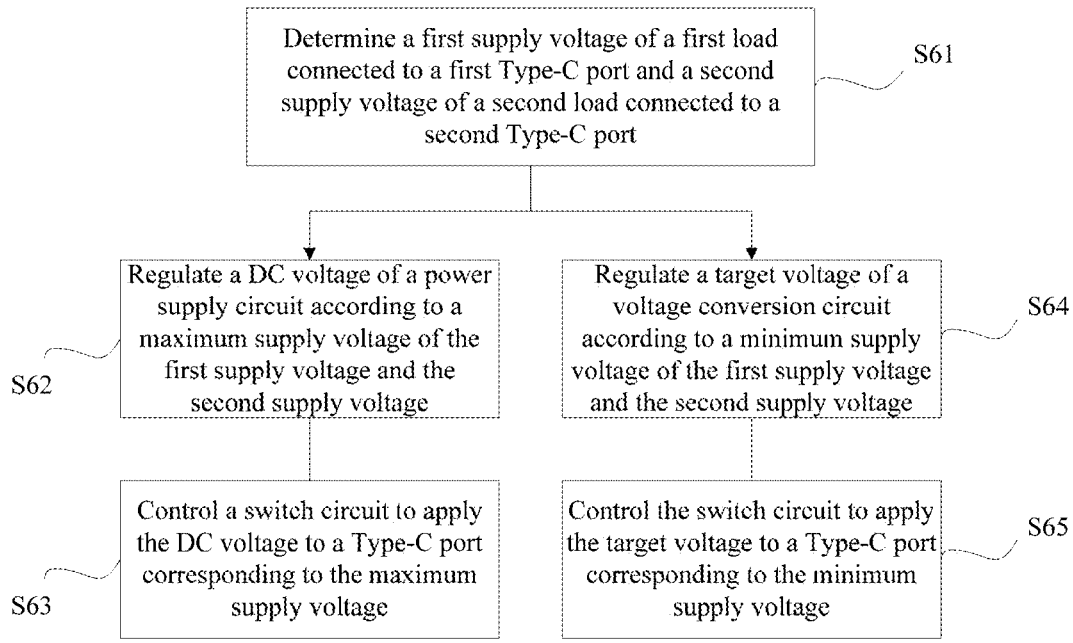
FIG. 6a is a schematic flowchart of a charging method based on a USB Type-C interface circuit according to an embodiment of the present application.

As another aspect of the embodiments of the present application, an embodiment of the present application further provides a charging method based on a USB Type-C interface circuit. Referring to FIG. 6a, FIG. 6a is a schematic flowchart of a charging method based on a USB Type-C interface circuit according to an embodiment of the present application. As illustrated in FIG. 6a, the method includes:

S61: determining a first supply voltage of a first load connected to a first Type-C port and a second supply voltage of a second load connected to a second Type-C port;

S62: regulating a DC voltage of a power supply circuit according to a maximum supply voltage of the first supply voltage and the second supply voltage;

S63: controlling a switch circuit to apply the DC voltage to a Type-C port corresponding to the maximum supply voltage;

S64: regulating a target voltage of a voltage conversion circuit according to a minimum supply voltage of the first supply voltage and the second supply voltage;

S65: controlling the switch circuit to apply the target voltage to a Type-C port corresponding to the minimum supply voltage;

wherein the power supply circuit is connected to the first Type-C port and the second Type-C port by the switch circuit, and the voltage conversion circuit is connected to the first Type-C port and the second Type-C port by the switch circuit.

In this embodiment, with the method herein, a high device utilization rate is maintained and system efficiency is effectively improved, while multi-port charging requirements are satisfied.

Figure 6B:
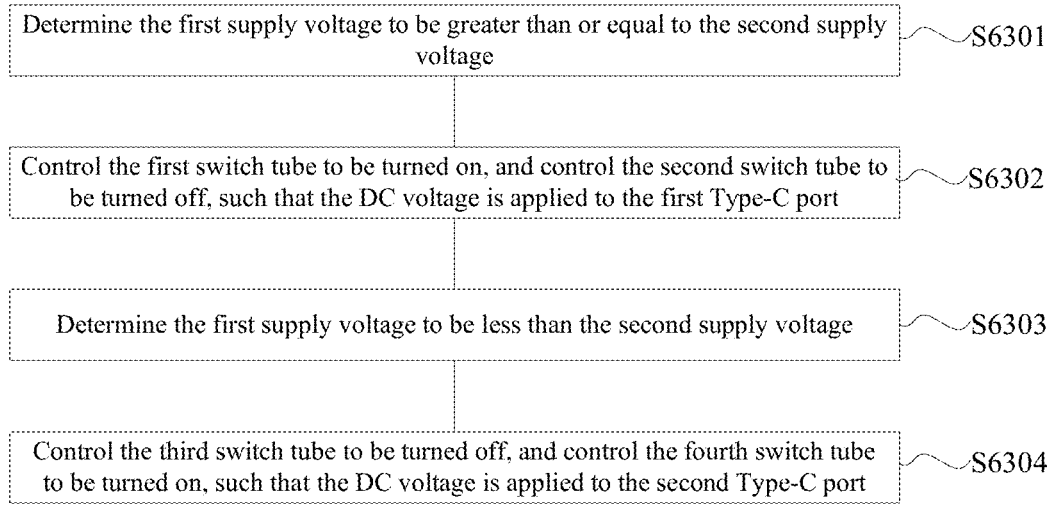

In some embodiments, the switch circuit includes a first switch tube, a second switch tube, a third switch tube and a fourth switch tube, wherein the first switch tube is connected between the power supply and the first Type-C port, the second switch tube is connected between the voltage conversion circuit and the first Type-C port, the third switch tube is connected between the voltage conversion circuit and the second Type-C port, and the fourth switch tube is connected between the power supply circuit and the second Type-C port. As illustrated in FIG. 6b, S63 includes:

S6301: determining the first supply voltage to be greater than or equal to the second supply voltage;

S6302: controlling the first switch tube to be turned on, and controlling the second switch tube to be turned off, such that the DC voltage is applied to the first Type-C port;

S6303: determining the first supply voltage to be less than the second supply voltage; and S6304: controlling the third switch tube to be turned off, and controlling the fourth switch tube to be turned on, such that the DC voltage is applied to the second Type-C port.

Figure 6C:
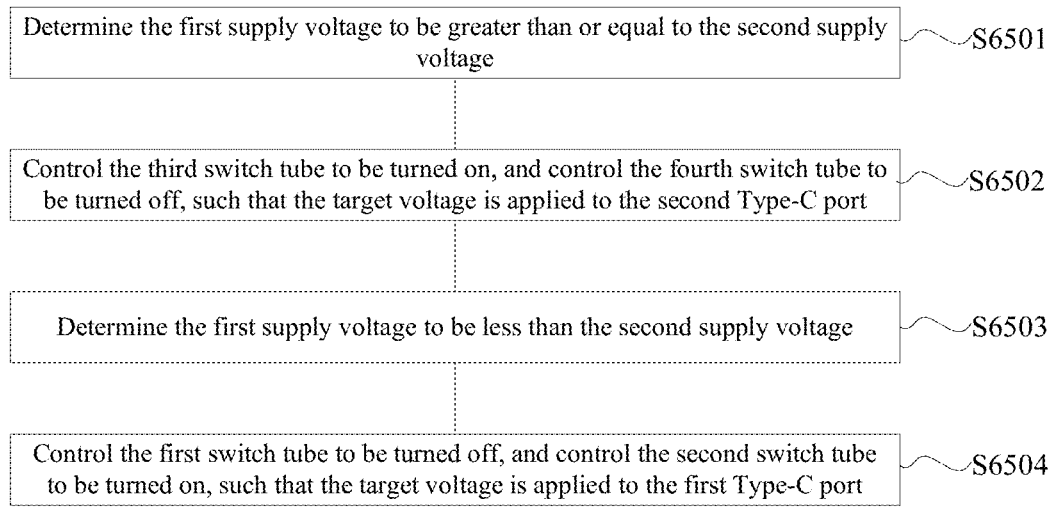

In some embodiments, as illustrated in FIG. 6c, S65 includes:

S6501: determining the first supply voltage to be greater than or equal to the second supply voltage;

S6502: controlling the third switch tube to be turned on, and controlling the fourth switch tube to be turned off, such that the target voltage is applied to the second Type-C port;

S6503: determining the first supply voltage to be less than the second supply voltage; and S6504: controlling the first switch tube to be turned off, and controlling the second switch tube to be turned on, such that the target voltage is applied to the first Type-C port.

In some embodiments, as illustrated in FIG. 7, the method further includes:

S701: when the first supply voltage is greater than or equal to the second supply voltage, the first switch tube and the third switch tube are turned on, and the second switch tube and the fourth switch tube are turned off, if the first load connected to the first Type-C port re-requests a third supply voltage, and the third supply voltage is equal to the second supply voltage, regulating the DC voltage of the power supply circuit, wherein the regulated DC voltage is equal to the second supply voltage;

S702: controlling all the switch tubes in the switch circuit to be constantly on for a first predetermined duration; and S703: upon the first predetermined duration, controlling all the switch tubes in the switch circuit to be continuously turned on, or controlling the first switch tube and the third switch tube to be turned on, or controlling the first switch tube and the fourth switch tube to be turned on, or controlling the second switch tube and the third switch tube to be turned on, or controlling the second switch tube and the fourth switch tube to be turned on.

In some embodiments, as illustrated in FIG. 8, the method further includes:

S801: when the first supply voltage is greater than or equal to the second supply voltage, the first switch tube and the third switch tube are turned on, and the second switch tube and the fourth switch tube are turned off, if the first load connected to the first Type-C port re-requests a fourth supply voltage, and the fourth supply voltage is less than the second supply voltage, regulating the DC voltage of the power supply circuit, wherein the regulated DC voltage is equal to the second supply voltage;

S802: controlling all the switch tubes in the switch circuit to be constantly on for a second predetermined duration;

S803: upon the second predetermined duration, controlling the second switch tube and the fourth switch tube to be continuously turned on, and controlling the first switch tube and the third switch tube to be turned off; and S804: regulating the target voltage of the voltage conversion circuit, such that the regulated target voltage is applied to the first Type-C port, wherein the regulated target voltage is equal to the fourth supply voltage.

In some embodiments, as illustrated in FIG. 9, the method further includes:

S901: when the first supply voltage is greater than or equal to the second supply voltage, the first switch tube and the third switch tube are turned on, and the second switch tube and the fourth switch tube are turned off, if the second load connected to the second Type-C port re-requests a fifth supply voltage, and the fifth supply voltage is equal to the first supply voltage, regulating the target voltage of the voltage conversion circuit, wherein the regulated target voltage is equal to the first supply voltage;

S902: controlling all the switch tubes in the switch circuit to be constantly on for a third predetermined duration; and S903: upon the third predetermined duration, controlling all the switch tubes in the switch circuit to be continuously turned on, or controlling the first switch tube and the third switch tube to be turned on, or controlling the first switch tube and the fourth switch tube to be turned on, or controlling the second switch tube and the third switch tube to be turned on, or controlling the second switch tube and the fourth switch tube to be turned on.

In some embodiments, as illustrated in FIG. 10, the method further includes:

S1001: when the first supply voltage is greater than or equal to the second supply voltage, the first switch tube and the third switch tube are turned on, and the second switch tube and the fourth switch tube are turned off, if the second load connected to the second Type-C port re-requests a sixth supply voltage, wherein the sixth supply voltage is greater to the first supply voltage, regulating the target voltage of the voltage conversion circuit, wherein the regulated target voltage is equal to the first supply voltage;

S1002: controlling all the switch tubes in the switch circuit to be constantly on for a fourth predetermined duration;

S1003: upon the fourth predetermined duration, controlling the second switch tube and the fourth switch tube to be continuously turned on, and controlling the first switch tube and the third switch tube to be turned off; and S1004: regulating the DC voltage of the power supply circuit, such that the DC voltage is applied to the second Type-C port, wherein the regulated DC voltage is equal to the sixth supply voltage.

In some embodiments, as illustrated in FIG. 11, the method further includes:

S1101: when the first supply voltage is less than or equal to the second supply voltage, the second switch tube and the fourth switch tube are turned on, and the first switch tube and the third switch tube are turned off, if the first load connected to the first Type-C port re-requests a seventh supply voltage, and the seventh supply voltage is equal to the second supply voltage, regulating the target voltage of the voltage conversion circuit, wherein the regulated target voltage is equal to the second supply voltage;

S1102: controlling all the switch tubes in the switch circuit to be constantly on for a fifth predetermined duration; and S1103: upon the fifth predetermined duration, controlling all the switch tubes in the switch circuit to be continuously turned on, or controlling the first switch tube and the third switch tube to be turned on, or controlling the first switch tube and the fourth switch tube to be turned on, or controlling the second switch tube and the third switch tube to be turned on, or controlling the second switch tube and the fourth switch tube to be turned on.

In some embodiments, as illustrated in FIG. 12, the method further includes:

S1201: when the first supply voltage is less than or equal to the second supply voltage, the second switch tube and the fourth switch tube are turned on, and the first switch tube and the third switch tube are turned off, if the first load connected to the first Type-C port re-requests a eighth supply voltage, and the eighth supply voltage is equal to the second supply voltage, regulating the target voltage of the voltage conversion circuit, wherein the regulated target voltage is equal to the second supply voltage;

S1202: controlling all the switch tubes in the switch circuit to be constantly on for a sixth predetermined duration;

S1203: upon the sixth predetermined duration, controlling the first switch tube and the third switch tube to be continuously turned on, and controlling the second switch tube and the fourth switch tube to be turned off; and S1204: regulating the DC voltage of the power supply circuit, such that the DC voltage is applied to the first Type-C port, wherein the regulated DC voltage is equal to the eighth supply voltage.

Figure 13:
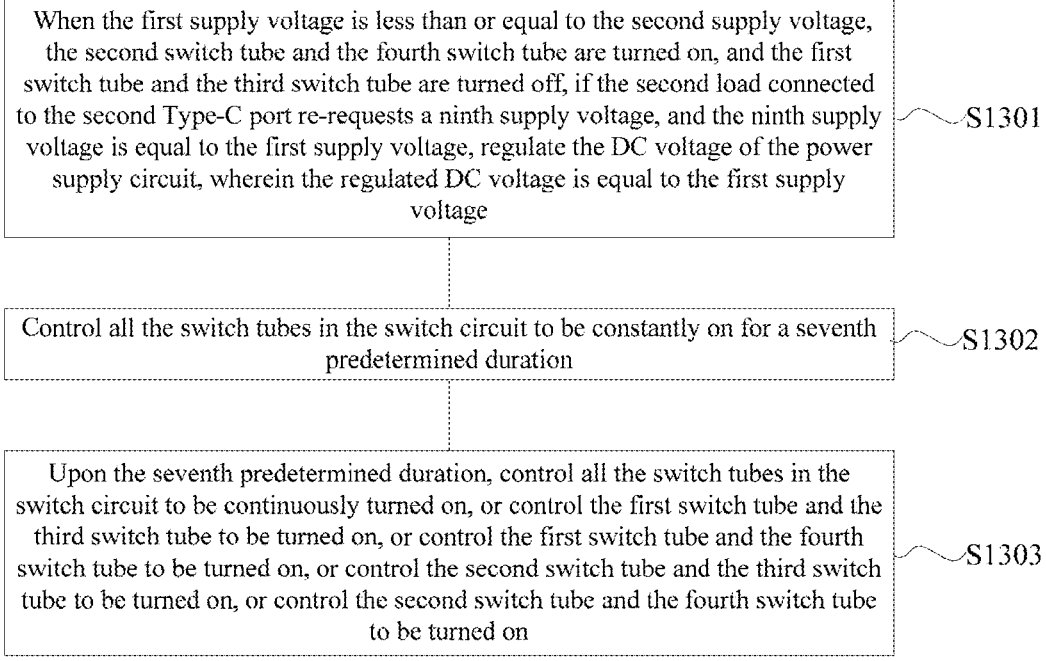
FIG. 13 is a schematic flowchart of a charging method based on a USB Type-C interface circuit according to yet still another embodiment of the present application.

In some embodiments, as illustrated in FIG. 13, the method further includes:

S1301: when the first supply voltage is less than or equal to the second supply voltage, the second switch tube and the fourth switch tube are turned on, and the first switch tube and the third switch tube are turned off, if the second load connected to the second Type-C port re-requests a ninth supply voltage, and the ninth supply voltage is equal to the first supply voltage, regulating the DC voltage of the power supply circuit, wherein the regulated DC voltage is equal to the first supply voltage;

S1302: controlling all the switch tubes in the switch circuit to be constantly on for a seventh predetermined duration; and S1303: upon the seventh predetermined duration, controlling all the switch tubes in the switch circuit to be continuously turned on, or controlling the first switch tube and the third switch tube to be turned on, or controlling the first switch tube and the fourth switch tube to be turned on, or controlling the second switch tube and the third switch tube to be turned on, or controlling the second switch tube and the fourth switch tube to be turned on.

Figure 14:
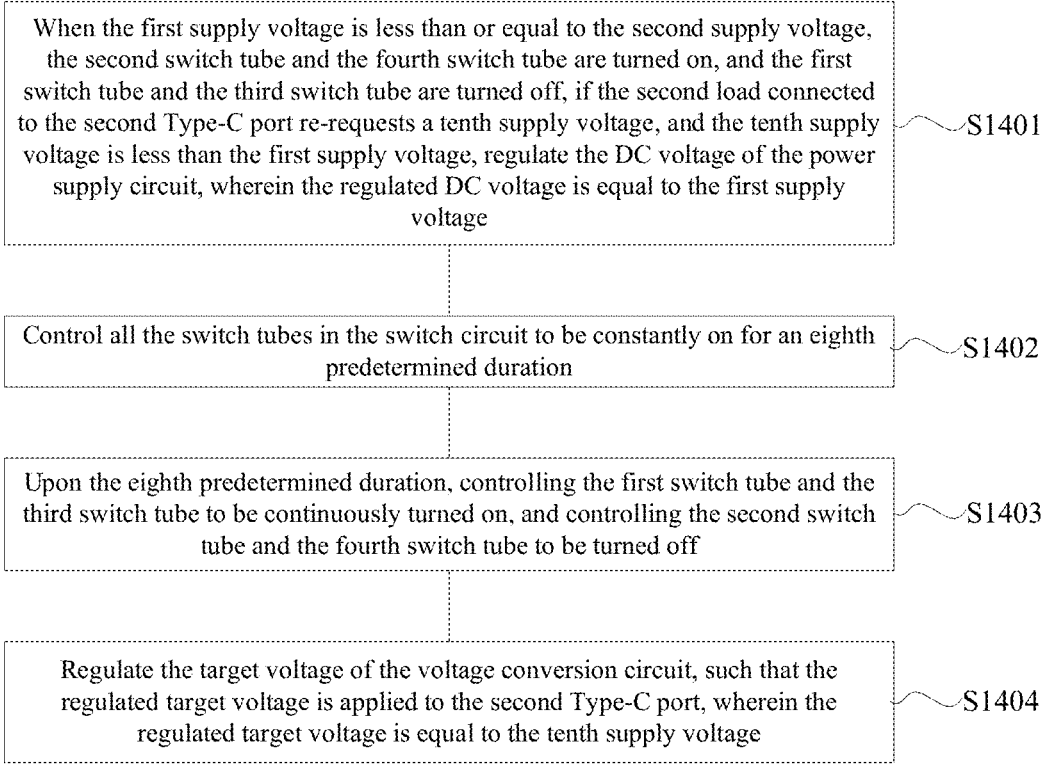
FIG. 14 is a schematic flowchart of a charging method based on a USB Type-C interface circuit according to yet still another embodiment of the present application.

In some embodiments, as illustrated in FIG. 14, the method further includes:

S1401: when the first supply voltage is less than or equal to the second supply voltage, the second switch tube and the fourth switch tube are turned on, and the first switch tube and the third switch tube are turned off, if the second load connected to the second Type-C port re-requests a tenth supply voltage, and the tenth supply voltage is less than the first supply voltage, regulating the DC voltage of the power supply circuit, wherein the regulated DC voltage is equal to the first supply voltage;

S1402: controlling all the switch tubes in the switch circuit to be constantly on for an eighth predetermined duration;

S1403: upon the eighth predetermined duration, controlling the first switch tube and the third switch tube to be continuously turned on, and controlling the second switch tube and the fourth switch tube to be turned off; and S1404: regulating the target voltage of the voltage conversion circuit, such that the regulated target voltage is applied to the second Type-C port, wherein the regulated target voltage is equal to the tenth supply voltage.

In some of the above embodiments, a high device utilization rate is maintained and system efficiency is effectively improved, while multi-port charging requirements are satisfied; and in addition, in case of voltage switchover of a plurality of Type-C ports, the connected load is uninterrupted, such that hot switchover of the plurality of Type-C ports is implemented.

Figure 15:
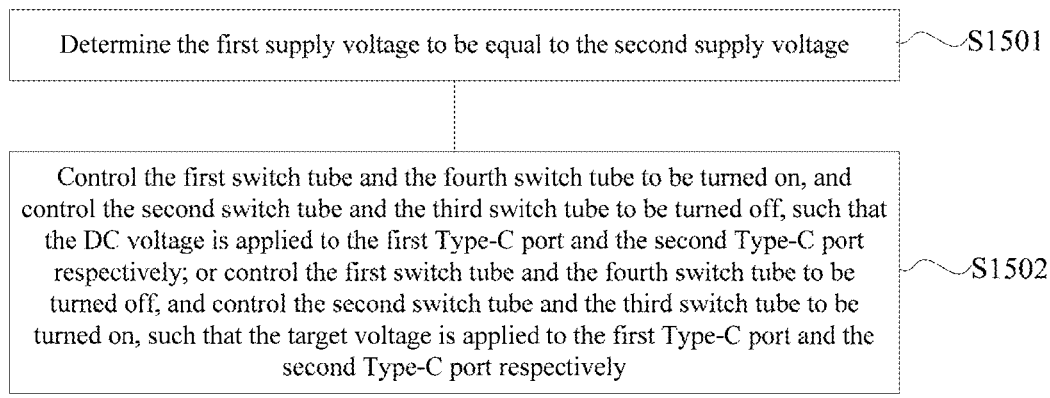
FIG. 15 is a schematic flowchart of a charging method based on a USB Type-C interface circuit according to yet still another embodiment of the present application.

In some embodiments, as illustrated in FIG. 15, the method further includes:

S1501: determining the first supply voltage to be equal to the second supply voltage;

S1502: controlling the first switch tube and the fourth switch tube to be turned on, and controlling the second switch tube and the third switch tube to be turned off, such that the DC voltage is applied to the first Type-C port and the second Type-C port respectively; or controlling the first switch tube and the fourth switch tube to be turned off, and controlling the second switch tube and the third switch tube to be turned on, such that the target voltage is applied to the first Type-C port and the second Type-C port respectively.

It may be understood that in S1502, since the first switch tube and the fourth switch tube are turned on such that the DC voltage is applied to the first Type-C port and the second Type-C port respectively, in this case, the power supply circuit may be in an operating state whereas the voltage conversion circuit may be in an idle state; and in the other case, since the second switch tube and the third switch tube are turned on such that the target voltage is applied to the first Type-C port and the second Type-C port respectively, in this case the power supply circuit is controlled to output a fixed DC voltage, wherein the DC voltage is greater than the first supply voltage and the second supply voltage, and the voltage conversion circuit is controlled to output an output voltage equal to the first supply voltage and the second supply voltage.

Figure 16A:
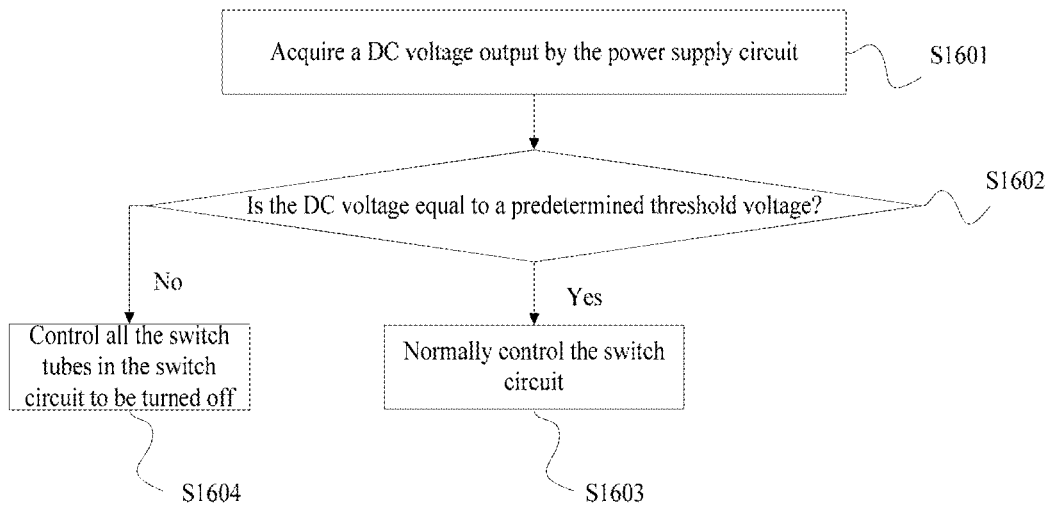
FIG. 16a is a schematic flowchart of a charging method based on a USB Type-C interface circuit according to yet still another embodiment of the present application.

In some embodiments, as illustrated in FIG. 16a, the method further includes:

S1601: acquiring a DC voltage output by the power supply circuit;

S1602: judging whether the DC voltage is equal to a predetermined threshold voltage;

S1603: normally controlling the switch circuit if the DC voltage is equal to the predetermined threshold voltage; and S1604: controlling all the switch tubes in the switch circuit to be turned off if the DC voltage is not equal to the predetermined threshold voltage.

Figure 16B:
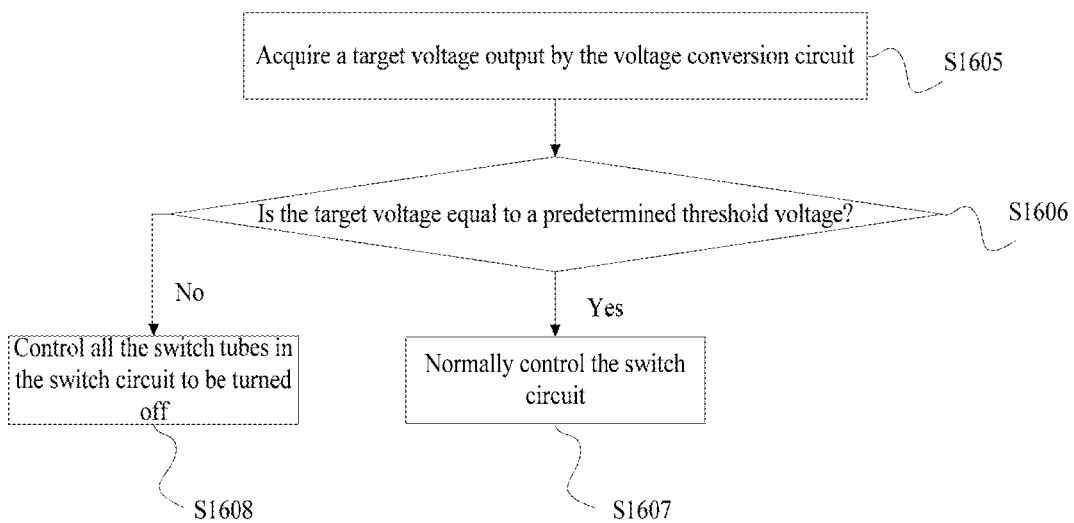
FIG. 16b is a schematic flowchart of a charging method based on a USB Type-C interface circuit according to yet still another embodiment of the present application.

As illustrated in FIG. 16b, the method further includes:

S1605: acquiring a target voltage output by the voltage conversion circuit;

S1606: judging whether the target voltage is equal to a predetermined threshold voltage;

S1607: normally controlling the switch circuit if the target voltage is equal to the predetermined threshold voltage; and S1608: controlling all the switch tubes in the switch circuit to be turned off if the target voltage is not equal to the predetermined threshold voltage.

Figure 16C:
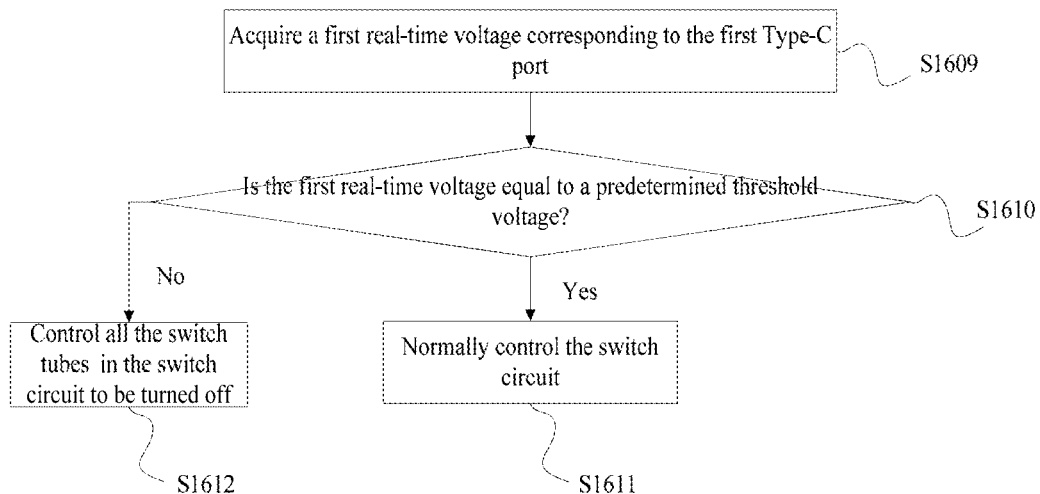
FIG. 16c is a schematic flowchart of a charging method based on a USB Type-C interface circuit according to yet still another embodiment of the present application.

As illustrated in FIG. 16c, the method further includes:

S1609: acquiring a first real-time voltage corresponding to the first Type-C port;

S1610: judging whether the first real-time voltage is equal to a predetermined threshold voltage;

S1611: normally controlling the switch circuit if the first real-time voltage is equal to the predetermined threshold voltage; and S1612: controlling all the switch tubes in the switch circuit to be turned off if the first real-time voltage is not equal to the predetermined threshold voltage.

Figure 16D:
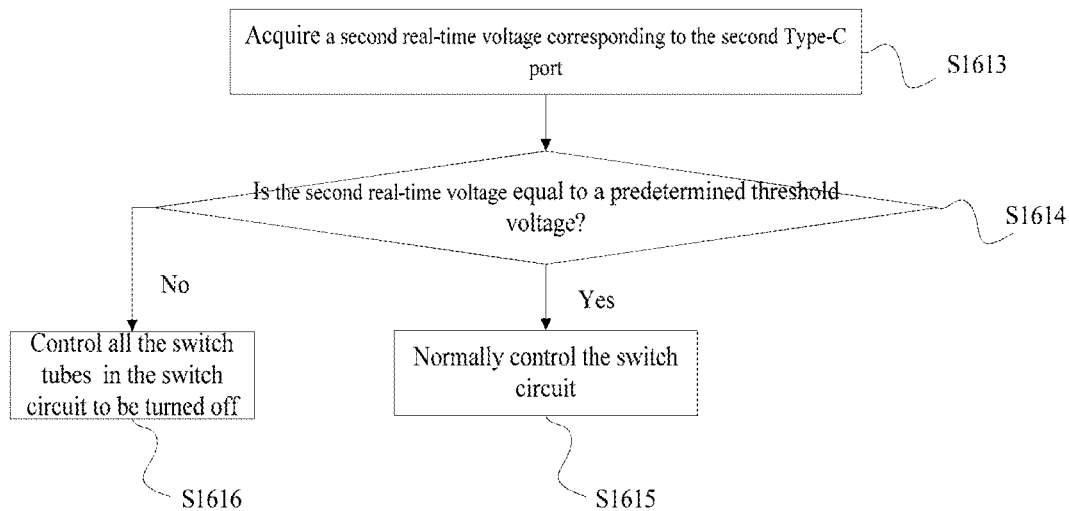
FIG. 16d is a schematic flowchart of a charging method based on a USB Type-C interface circuit according to yet still another embodiment of the present application.

As illustrated in FIG. 16d, the method further includes:

S1613: acquiring a second real-time voltage corresponding to the second Type-C port;

S1614: judging whether the second real-time voltage is equal to a predetermined threshold voltage;

S1615: normally controlling the switch circuit if the second real-time voltage is equal to the predetermined threshold voltage; and S1616: controlling all the switch tubes in the switch circuit to be turned off if the second real-time voltage is not equal to the predetermined threshold voltage.

In this embodiment, the DC voltage output by the power supply circuit, the target voltage output by the voltage conversion circuit, the first real-time voltage of the first Type-C port, and the second real-time voltage of the second Type-C port are acquired; and the operating state of the switch circuit is controlled according to the DC voltage, the target voltage, the first real-time voltage or the second real-time voltage. For example, when any one or more of the DC voltage, the target voltage, the first real-time voltage and the second real-time voltage is not equal to a predetermined threshold voltage, all the switch tubes in the switch circuit are controlled to be turned off. In this way, when any one or more of the DC voltage, the target voltage, the first real-time voltage and the second real-time voltage encounters an exception, the load is effectively protected.

As another aspect of the embodiments of the present application, an embodiment of the present application further provides a USB device. The USB device includes the USB Type-C interface circuit as illustrated in FIG. 4 or FIG. 5.

As another aspect of the embodiments of the present application, an embodiment of the present application further provides an electronic device. The electronic device includes the USB Type-C interface circuit as illustrated in FIG. 4 or FIG. 5.

It should be finally noted that the present application may be practiced in different ways or forms, and the practice is not limited to the embodiments described herein in the specification. These illustrated embodiments construe no extra limitation to the disclosure of the present application. These embodiments are described only for better and thorough understanding of the disclosure of the present application. In addition, based on the inventive concepts of the present application, the above described technical features may be incorporated and combined with each other to derive various variations in different aspects of the present application, and such derived variations shall all be deemed as falling within the scope of the disclosure contained in the specification of the present invention. Further, a person skilled in the art may make improvements or variations according to the above description, and such improvements or variations shall all fall within the protection scope as defined by the claims of the present application.

What is claimed is:

1. A USB Type-C interface circuit, comprising:
   a power supply circuit, configured to output a DC voltage;
   a voltage conversion circuit, configured to convert the DC voltage to a target voltage, wherein, the voltage conversion circuit is a step-down conversion circuit;
   a first Type-C port, configured to be connected to a first load;
   a second Type-C port, configured to be connected to a second load;
   a switch circuit, connected to the power supply circuit, the voltage conversion circuit, the first Type-C port and the second Type-C port respectively; and
   a USB controller, communicated with the first Type-C port and the second Type-C port, wherein the USB controller is configured to:
   regulate the DC voltage of the power supply circuit according to a maximum supply voltage of a first supply voltage of the first load and a second supply voltage of the second load, and control the switch circuit to apply the DC voltage to a Type-C port corresponding to the maximum supply voltage; and
   regulate the target voltage of the voltage conversion circuit according to a minimum supply voltage of the first supply voltage and the second supply voltage, and control the switch circuit to apply the target voltage to a Type-C port corresponding to the minimum supply voltage.

2. The USB Type-C interface circuit according to claim 1, wherein the switch circuit comprises:
   a first switch circuit, connected to the power supply circuit, the voltage conversion circuit, the first Type-C port and the USB controller respectively; and
   a second switch circuit, connected to the power supply circuit, the voltage conversion circuit, the second Type-C port and the USB controller respectively; wherein
   the USB controller is configured to:
   control the first switch circuit and the second switch circuit to apply the DC voltage to the Type-C port corresponding to the maximum supply voltage, and apply the target voltage to the Type-C port corresponding to the minimum supply voltage.

3. The USB Type-C interface circuit according to claim 2, wherein the first switch circuit comprises:
- a first switch tube, connected between the power supply circuit and the first Type-C port, wherein the first switch tube is connected to the USB controller; and
- a second switch tube, connected between the voltage conversion circuit and the first Type-C port, wherein the second switch tube is connected to the USB controller; wherein
- when the first supply voltage is greater than or equal to the second supply voltage, the USB controller is configured to control the first switch tube to be turned on, and control the second switch tube to be turned off, such that the DC voltage is applied to the first Type-C port; and
- when the first supply voltage is less than or equal to the second supply voltage, the USB controller is configured to control the first switch tube to be turned off, and control the second switch tube to be turned on, such that the target voltage is applied to the first Type-C port.

4. The USB Type-C interface circuit according to claim 3, wherein the second switch circuit comprises:
- a third switch tube, connected between the voltage conversion circuit and the second Type-C port, wherein the third switch tube is connected to the USB controller; and
- a fourth switch tube, connected between the power supply circuit and the second Type-C port, wherein the fourth switch tube is connected to the USB controller; wherein
- when the first supply voltage is greater than or equal to the second supply voltage, the USB controller is configured to control the third switch tube to be turned on, and control the fourth switch tube to be turned off, such that the target voltage is applied to the second Type-C port; and
- when the first supply voltage is less than or equal to the second supply voltage, the USB controller is configured to control the third switch tube to be turned off, and control the fourth switch tube to be turned on, such that the DC voltage is applied to the second Type-C port.

5. A USB device, comprising a USB Type-C interface circuit, wherein the USB Type-C interface circuit comprises:
- a power supply circuit, configured to output a DC voltage;
- a voltage conversion circuit, configured to convert the DC voltage to a target voltage, wherein, the voltage conversion circuit is a step-down conversion circuit;
- a first Type-C port, configured to be connected to a first load;
- a second Type-C port, configured to be connected to a second load;
- a switch circuit, connected to the power supply circuit, the voltage conversion circuit, the first Type-C port and the second Type-C port respectively; and
- a USB controller, communicated with the first Type-C port and the second Type-C port, wherein the USB controller is configured to:
- regulate the DC voltage of the power supply circuit according to a maximum supply voltage of a first supply voltage of the first load and a second supply voltage of the second load, and control the switch circuit to apply the DC voltage to a Type-C port corresponding to the maximum supply voltage; and
- regulate the target voltage of the voltage conversion circuit according to a minimum supply voltage of the first supply voltage and the second supply voltage, and control the switch circuit to apply the target voltage to a Type-C port corresponding to the minimum supply voltage.

6. The USB device according to claim 5, wherein the switch circuit comprises:
- a first switch circuit, connected to the power supply circuit, the voltage conversion circuit, the first Type-C port and the USB controller respectively; and
- a second switch circuit, connected to the power supply circuit, the voltage conversion circuit, the second Type-C port and the USB controller respectively; wherein
- the USB controller is configured to:
- control the first switch circuit and the second switch circuit to apply the DC voltage to the Type-C port corresponding to the maximum supply voltage, and apply the target voltage to the Type-C port corresponding to the minimum supply voltage.

7. The USB device according to claim 6, wherein the first switch circuit comprises:
- a first switch tube, connected between the power supply circuit and the first Type-C port, wherein the first switch tube is connected to the USB controller; and
- a second switch tube, connected between the voltage conversion circuit and the first Type-C port, wherein the second switch tube is connected to the USB controller; wherein
- when the first supply voltage is greater than or equal to the second supply voltage, the USB controller is configured to control the first switch tube to be turned on, and control the second switch tube to be turned off, such that the DC voltage is applied to the first Type-C port; and
- when the first supply voltage is less than or equal to the second supply voltage, the USB controller is configured to control the first switch tube to be turned off, and control the second switch tube to be turned on, such that the target voltage is applied to the first Type-C port.

8. The USB device according to claim 7, wherein the second switch circuit comprises:
- a third switch tube, connected between the voltage conversion circuit and the second Type-C port, wherein the third switch tube is connected to the USB controller; and
- a fourth switch tube, connected between the power supply circuit and the second Type-C port, wherein the fourth switch tube is connected to the USB controller; wherein
- when the first supply voltage is greater than or equal to the second supply voltage, the USB controller is configured to control the third switch tube to be turned on, and control the fourth switch tube to be turned off, such that the target voltage is applied to the second Type-C port; and
- when the first supply voltage is less than or equal to the second supply voltage, the USB controller is configured to control the third switch tube to be turned off, and control the fourth switch tube to be turned on, such that the DC voltage is applied to the second Type-C port.

9. A charging method based on a UBS Type-C interface circuit, comprising:
- determining a first supply voltage and a second supply voltage, wherein the first supply voltage is a supply voltage of a first load connected to a first Type-C port, and the second supply voltage is a supply voltage of a second load connected to a second Type-C port;

regulating a DC voltage output by a power supply circuit according to a maximum supply voltage of the first supply voltage and the second supply voltage, and controlling a switch circuit to apply the DC voltage to a Type-C port corresponding to the maximum supply voltage, wherein the power supply circuit is connected to the first Type-C port and the second Type-C port by the switch circuit; and regulating a target voltage output by a voltage conversion circuit according to a minimum supply voltage of the first supply voltage and the second supply voltage, and controlling the switch circuit to apply the target voltage to a Type-C port corresponding to the minimum supply voltage, wherein the voltage conversion circuit is connected to the power supply circuit, the voltage conversion circuit is a step-down conversion circuit, and the voltage conversion circuit is connected to the first Type-C port and the second Type-C port by the switch circuit.

10. The method according to claim 9, wherein
the switch circuit comprises a first switch tube, a second switch tube, a third switch tube and a fourth switch tube, wherein the first switch tube is connected between the power supply and the first Type-C port, the second switch tube is connected between the voltage conversion circuit and the first Type-C port, the third switch tube is connected between the voltage conversion circuit and the second Type-C port, and the fourth switch tube is connected between the power supply circuit and the second Type-C port.

11. The method according to claim 10, wherein the controlling the switch circuit to apply the DC voltage to the Type-C port corresponding to the maximum supply voltage comprises:

when the first supply voltage is greater than or equal to the second supply voltage, controlling the first switch tube to be turned on, and controlling the second switch tube to be turned off, such that the DC voltage is applied to the first Type-C port; and when the first supply voltage is less than the second supply voltage, controlling the third switch tube to be turned off, and controlling the fourth switch tube to be turned on, such that the DC voltage is applied to the second Type-C port;

wherein the controlling the switch circuit to apply the target voltage to the Type-C port corresponding to the minimum supply voltage comprises:

when the first supply voltage is greater than or equal to the second supply voltage, controlling the third switch tube to be turned on, and controlling the fourth switch tube to be turned off, such that the target voltage is applied to the second Type-C port; and when the first supply voltage is less than the second supply voltage, controlling the first switch tube to be turned off, and controlling the second switch tube to be turned on, such that the target voltage is applied to the first Type-C port.

12. The method according to claim 10, further comprising:

on the premise that the first supply voltage is greater than or equal to the second supply voltage, the first switch tube and the third switch tube are turned on, and the second switch tube and the fourth switch tube are turned off:

if the first load connected to the first Type-C port re-requests a third supply voltage, wherein the third supply voltage is equal to the second supply voltage, regulating the DC voltage of the power supply circuit, wherein the regulated DC voltage is equal to the second supply voltage;

controlling all the switch tubes in the switch circuit to be constantly on for a first predetermined duration; and upon the first predetermined duration, controlling all the switch tubes in the switch circuit to be continuously turned on, or controlling the first switch tube and the third switch tube to be turned on, or controlling the first switch tube and the fourth switch tube to be turned on, or controlling the second switch tube and the third switch tube to be turned on, or controlling the second switch tube and the fourth switch tube to be turned on.

13. The method according to claim 10, further comprising:

on the premise that the first supply voltage is greater than or equal to the second supply voltage, the first switch tube and the third switch tube are turned on, and the second switch tube and the fourth switch tube are turned off:

if the first load connected to the first Type-C port re-requests a fourth supply voltage, wherein the fourth supply voltage is less than the second supply voltage, regulating the DC voltage of the power supply circuit, wherein the regulated DC voltage is equal to the second supply voltage;

controlling all the switch tubes in the switch circuit to be constantly on for a second predetermined duration;

upon the second predetermined duration, controlling the second switch tube and the fourth switch tube to be continuously turned on, and controlling the first switch tube and the third switch tube to be turned off; and regulating the target voltage of the voltage conversion circuit, such that the regulated target voltage is applied to the first Type-C port, wherein the regulated target voltage is equal to the fourth supply voltage.

14. The method according to claim 10, further comprising:

on the premise that the first supply voltage is greater than or equal to the second supply voltage, the first switch tube and the third switch tube are turned on, and the second switch tube and the fourth switch tube are turned off:

if the second load connected to the second Type-C port re-requests a fifth supply voltage, wherein the fifth supply voltage is equal to the first supply voltage, regulating the target voltage of the voltage conversion circuit, wherein the regulated target voltage is equal to the first supply voltage;

controlling all the switch tubes in the switch circuit to be constantly on for a third predetermined duration; and upon the third predetermined duration, controlling all the switch tubes in the switch circuit to be continuously turned on, or controlling the first switch tube and the third switch tube to be turned on, or controlling the first switch tube and the fourth switch tube to be turned on, or controlling the second switch tube and the third switch tube to be turned on, or controlling the second switch tube and the fourth switch tube to be turned on.

15. The method according to claim 10, further comprising:

on the premise that the first supply voltage is greater than or equal to the second supply voltage, the first switch tube and the third switch tube are turned on, and the second switch tube and the fourth switch tube are turned off:

if the second load connected to the second Type-C port re-requests a sixth supply voltage, wherein the sixth supply voltage is greater than the first supply voltage, regulating the target voltage of the voltage conversion circuit, wherein the regulated target voltage is equal to the first supply voltage;

controlling all the switch tubes in the switch circuit to be constantly on for a fourth predetermined duration;

upon the fourth predetermined duration, controlling the second switch tube and the fourth switch tube to be continuously turned on, and controlling the first switch tube and the third switch tube to be turned off; and regulating the DC voltage of the power supply circuit, such that the DC voltage is applied to the second Type-C port, wherein the regulated DC voltage is equal to the sixth supply voltage.

16. The method according to claim 10, further comprising:

on the premise that the first supply voltage is less than or equal to the second supply voltage, the second switch tube and the fourth switch tube are turned on, and the first switch tube and the third switch tube are turned off:

if the first load connected to the first Type-C port re-requests a seventh supply voltage, wherein the seventh supply voltage is equal to the second supply voltage, regulating the target voltage of the voltage conversion circuit, wherein the regulated target voltage is equal to the second supply voltage;

controlling all the switch tubes in the switch circuit to be constantly on for a fifth predetermined duration; and upon the fifth predetermined duration, controlling all the switch tubes in the switch circuit to be continuously turned on, or controlling the first switch tube and the third switch tube to be turned on, or controlling the first switch tube and the fourth switch tube to be turned on, or controlling the second switch tube and the third switch tube to be turned on, or controlling the second switch tube and the fourth switch tube to be turned on.

17. The method according to claim 10, further comprising:

on the premise that the first supply voltage is less than or equal to the second supply voltage, the second switch tube and the fourth switch tube are turned on, and the first switch tube and the third switch tube are turned off:

if the first load connected to the first Type-C port re-requests an eighth supply voltage, wherein the eighth supply voltage is equal to the second supply voltage, regulating the target voltage of the voltage conversion circuit, wherein the regulated target voltage is equal to the second supply voltage;

controlling all the switch tubes in the switch circuit to be constantly on for a sixth predetermined duration;

upon the sixth predetermined duration, controlling the first switch tube and the third switch tube to be continuously turned on, and controlling the second switch tube and the fourth switch tube to be turned off; and regulating the DC voltage of the power supply circuit, such that the DC voltage is applied to the first Type-C port, wherein the regulated DC voltage is equal to the eighth supply voltage.

18. The method according to claim 10, further comprising:

on the premise that the first supply voltage is less than or equal to the second supply voltage, the second switch tube and the fourth switch tube are turned on, and the first switch tube and the third switch tube are turned off:

if the second load connected to the second Type-C port re-requests a ninth supply voltage, wherein the ninth supply voltage is equal to the first supply voltage, regulating the DC voltage of the power supply circuit, wherein the regulated DC voltage is equal to the first supply voltage;

controlling all the switch tubes in the switch circuit to be constantly on for a seventh predetermined duration; and upon the seventh predetermined duration, controlling all the switch tubes in the switch circuit to be continuously turned on, or controlling the first switch tube and the third switch tube to be turned on, or controlling the first switch tube and the fourth switch tube to be turned on, or controlling the second switch tube and the third switch tube to be turned on, or controlling the second switch tube and the fourth switch tube to be turned on.

19. The method according to claim 10, further comprising:

on the premise that the first supply voltage is less than or equal to the second supply voltage, the second switch tube and the fourth switch tube are turned on, and the first switch tube and the third switch tube are turned off:

if the second load connected to the second Type-C port re-requests a tenth supply voltage, wherein the tenth supply voltage is equal to the first supply voltage, regulating the DC voltage of the power supply circuit, wherein the regulated DC voltage is equal to the first supply voltage;

controlling all the switch tubes in the switch circuit to be constantly on for an eighth predetermined duration;

upon the eighth predetermined duration, controlling the first switch tube and the third switch tube to be continuously turned on, and controlling the second switch tube and the fourth switch tube to be turned off; and regulating the target voltage of the voltage conversion circuit, such that the regulated target voltage is applied to the second Type-C port, wherein the regulated target voltage is equal to the tenth supply voltage.

20. The method according to claim 10, further comprising:

when the first supply voltage is equal to the second supply voltage, controlling the first switch tube and the fourth switch tube to be turned on, and controlling the second switch tube and the third switch tube to be turned off, such that the DC voltage is applied to the first Type-C port and the second Type-C port respectively; or controlling the first switch tube and the fourth switch tube to be turned off, and controlling the second switch tube and the third switch tube to be turned on, such that the target voltage is applied to the first Type-C port and the second Type-C port respectively.

* * * * *